United States Patent [19]

Drabowitch

[11] Patent Number: 4,853,701
[45] Date of Patent: Aug. 1, 1989

[54] PULSE COMPRESSION METHOD EMPLOYING SPACE-CODING, AND ITS APPLICATION TO A RADAR

[75] Inventor: Serge Drabowitch, Paris, France

[73] Assignee: Thomson-CSF, Paris, France

[21] Appl. No.: 528,458

[22] Filed: Aug. 29, 1983

[30] Foreign Application Priority Data

Aug. 27, 1982 [FR] France ................................. 82 14736

[51] Int. Cl.⁴ .......................... G01S 13/42; G01S 13/28
[52] U.S. Cl. .................................... 342/139; 342/131; 342/146; 342/201
[58] Field of Search ............... 343/17.2 PC, 17.1 PW; 367/101, 102; 342/131, 139, 146, 201

[56] References Cited

U.S. PATENT DOCUMENTS

| | | | |
|---|---|---|---|
| 3,130,410 | 4/1964 | Gutleber | 343/844 |
| 3,917,999 | 11/1975 | Gutleber | 375/1 |
| 3,955,197 | 5/1976 | Gutleber et al. | 343/17.2 PC |
| 4,319,348 | 3/1982 | Suzuki | 367/101 |
| 4,456,982 | 6/1984 | Tournois | 367/101 |

Primary Examiner—Thomas H. Tarcza
Assistant Examiner—Gilberto Barrón, Jr.
Attorney, Agent, or Firm—Cushman, Darby & Cushman

[57] ABSTRACT

Pulse-compression method employing space-coding, according to which a plurality of pulsed signals are emitted, simultaneously, for a time $(1/\Delta f)$, at frequencies which are uniformly graded by an increment $(\Delta f)$, the pulsed signals which are returned by any target being spatially compressed, the compression factor being equal to the number of signals which were emitted simultaneously.

10 Claims, 5 Drawing Sheets

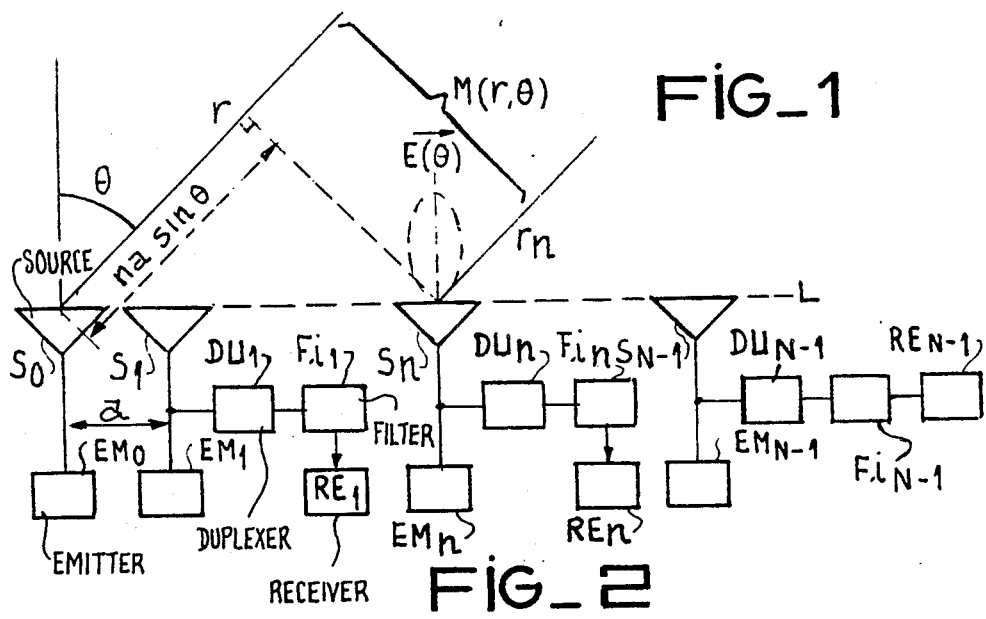
FIG_1
FIG_2
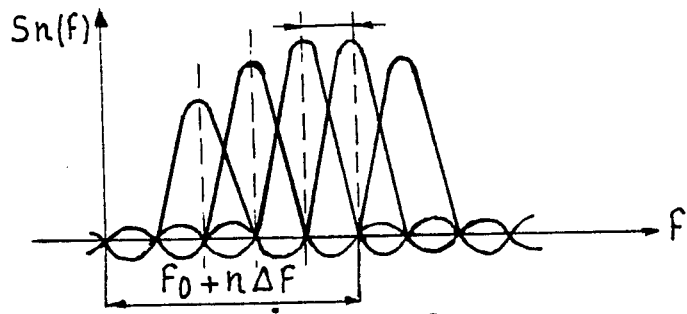
FIG_3
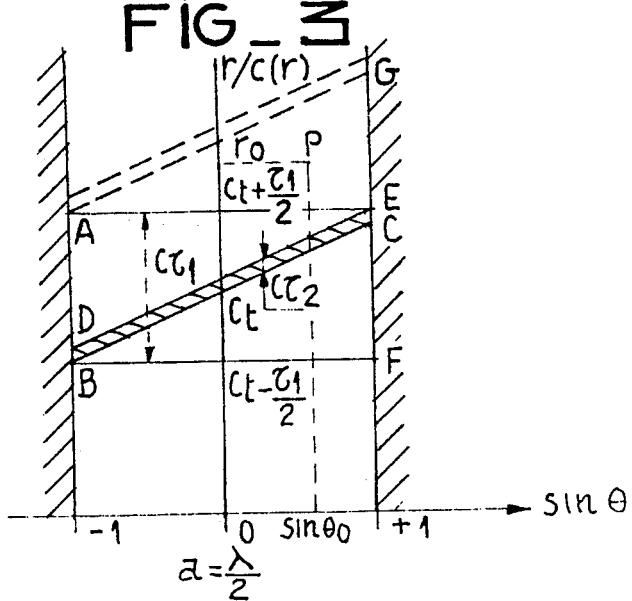

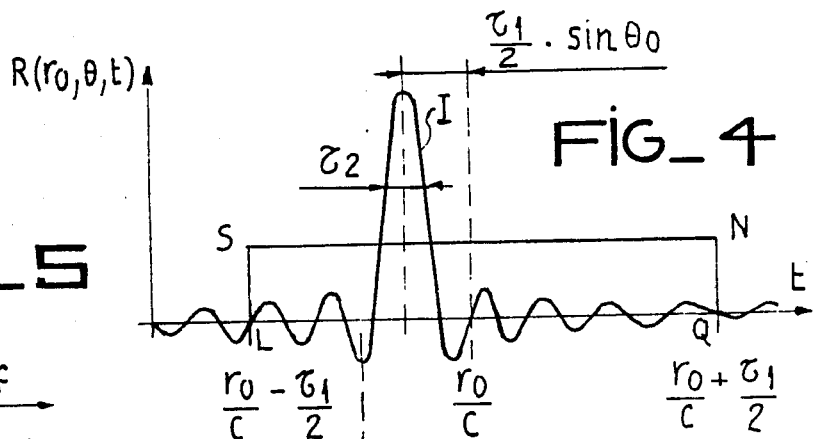
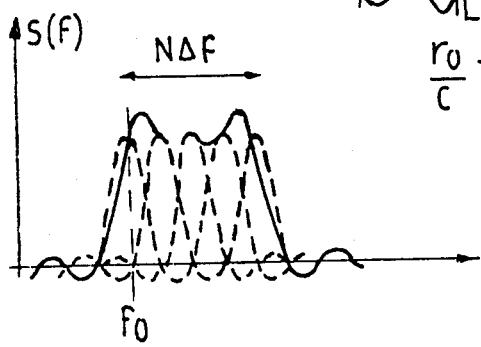
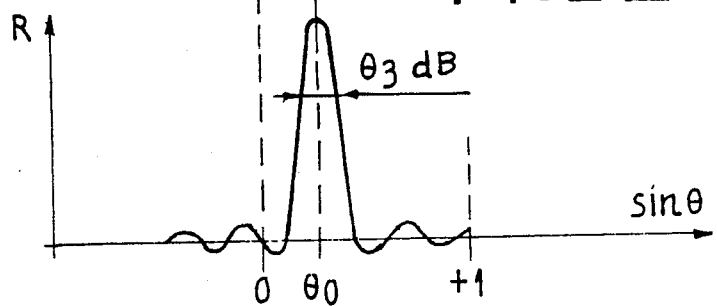
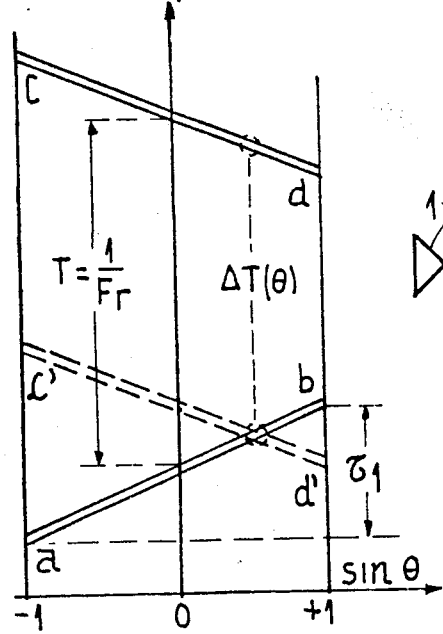
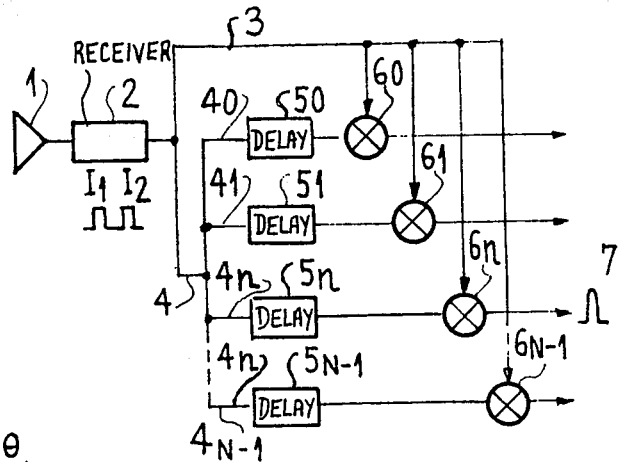

FIG_9
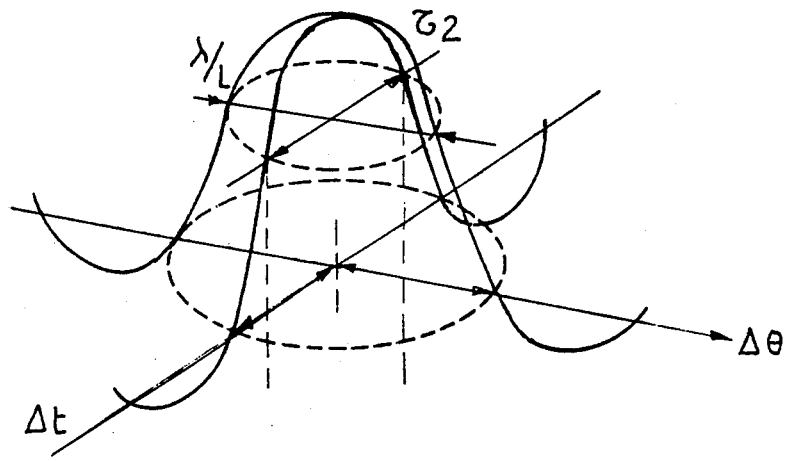
FIG_10
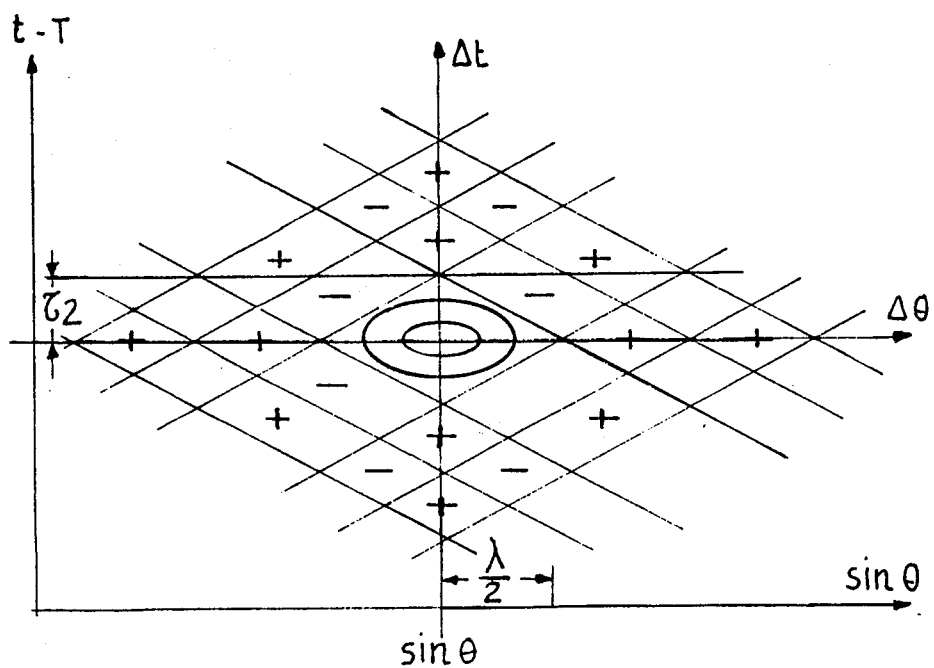

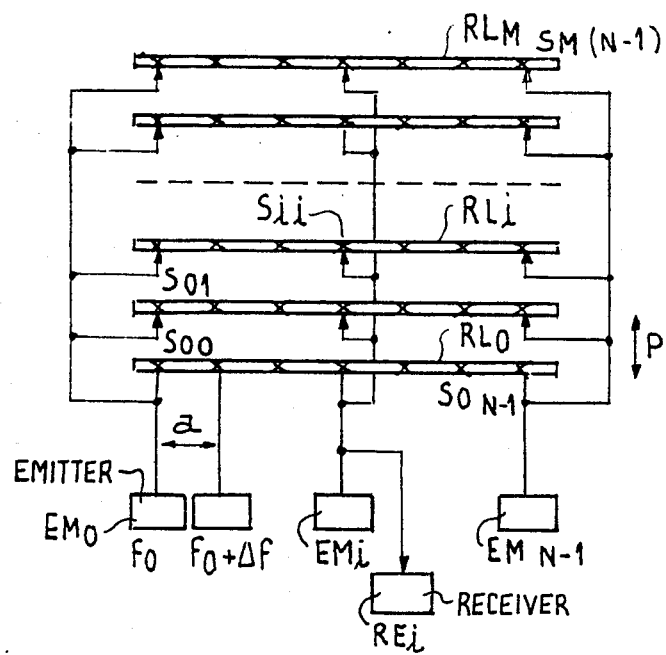
FIG_11
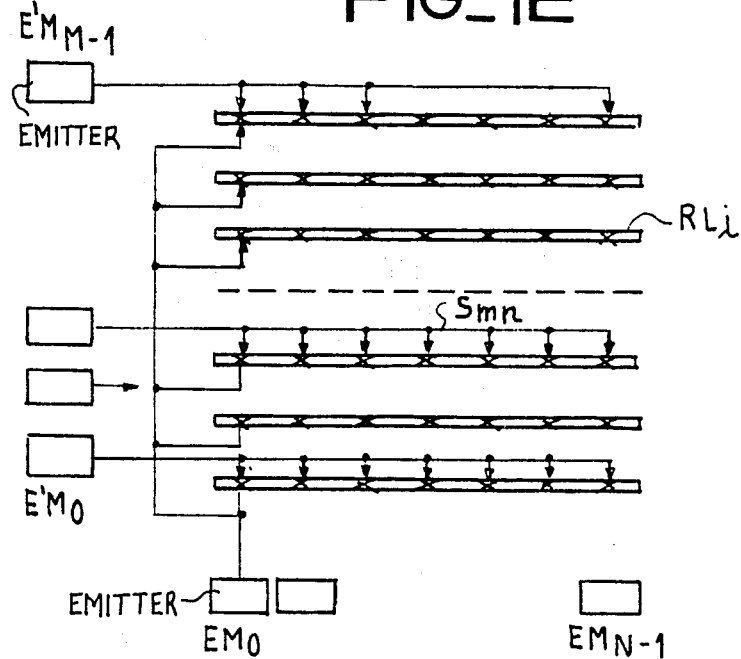
FIG_12

FIG_13
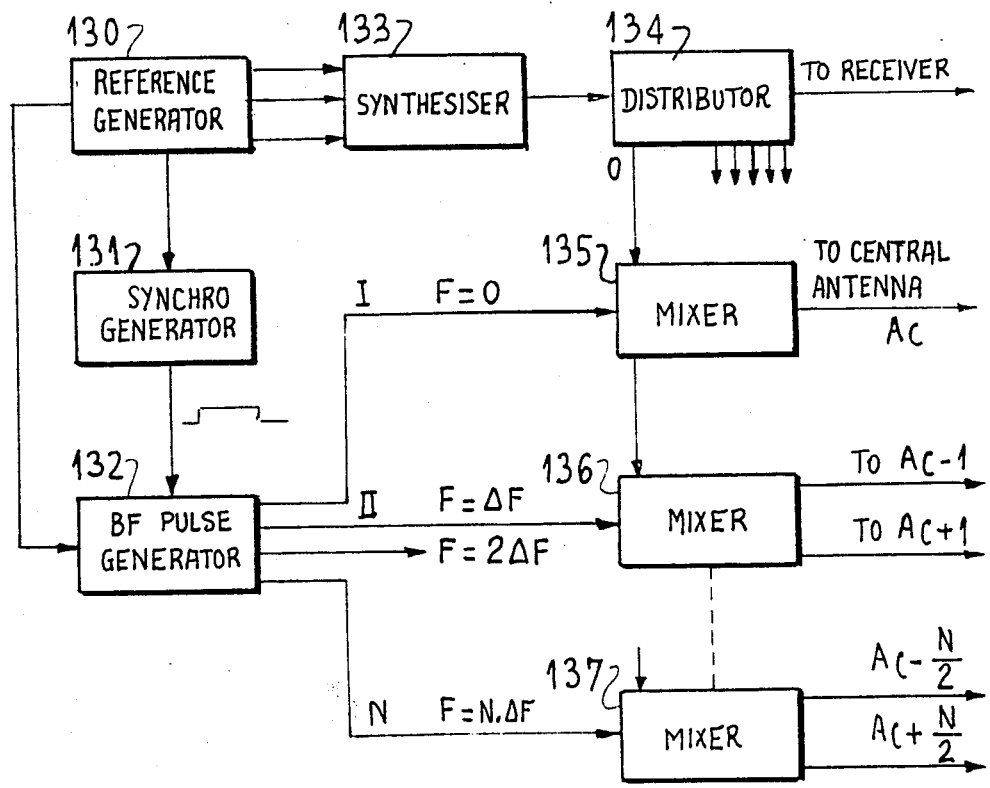

PULSE COMPRESSION METHOD EMPLOYING SPACE-CODING, AND ITS APPLICATION TO A RADAR

BACKGROUND OF THE INVENTION

The present invention relates in general to pulse-compression employing space-coding. It is primarily applicable to a radar although the invention has other uses.

Pulse-compression radars are known, and these will be termed "classical" pulse-compression radars in contrast to those which make use of the now claimed invention. In classical pulse-compression, long, frequency-modulated pulses are transmitted using linear modulation. Received signals are compressed using matched dispersive filters or correlators.

Using classical pulse-compression requires a relatively complex receiver.

An object of the invention is to provide a new pulse-compression radar which utilises space as the medium in which a transmitted signal is compressed spatially and temporally, over a wide band.

SUMMARY OF THE INVENTION

According to the invention, there is provided a pulse-compression arrangement using the simultaneous transmission, for a time $\tau_1$, of a plurality of pulsed signals, at several points in space, at frequencies which are mutually coherent and which are uniformly "graded" by frequency increments corresponding to $1/\tau_1$. These signals become in phase with one another at instants which are separated by constant time intervals equal to $\tau_1$, the pulsed signals which are returned by a target of any kind then being spatially compressed, the compression factor being equal to the number of signals which were emitted simultaneously, N, and being of duration $\tau_2 = \tau_1/N$.

By implementing this technique, the receiver can be simplified in comparison with classical receivers, in that, here, a simple band-rejection filter, with a width equal to $N\Delta f$, forms a matched filter. More elaborate types of matched filters, such as, for example, a delay which is proportional to the frequency, or the use of correlators, would no longer be necessary.

In accordance with an alternative embodiment of the invention, the pulse-compression method employing space-coding is characterised by the simultaneous transmission of a plurality of pulses, at several points along a linear source-array, at frequencies which increase along the array, by an increment $\Delta f$, followed by the simultaneous transmission of a second plurality of pulses, at frequencies which decrease, in a uniform manner, by an increment $\Delta f$, along the array. The time interval separating the two compressed pulses which are returned by a target are proportional to the sine of the angle which the direction of the target makes with a line normal to the array.

BRIEF DESCRIPTION OF THE DRAWINGS

Other advantages and characteristics of the invention will become evident in the course of the description which follows, and which is presented with the aid of the figures, in which:

FIG. 1 shows a linear array, containing N sources, which is used in accordance with the invention;

FIG. 2 shows the radiation pattern of this array as a function of the frequency;

FIG. 3 shows a representation of the transmitted pulses, and of the compressed, received pulses, in a graph in which distance is plotted as a function of the sine of the angle;

FIG. 4 shows the representation of a compressed pulse, in a graph in which the array-factor, R, is plotted as a function of time, t;

FIG. 5 shows the representation of the spectrum, S(f), of the transmitted pulses;

FIG. 6 shows a representation of the array-function, R, as a function of the sine of the angle at which the observation is made;

FIG. 7 shows the graph of the distance, r, as a function of the sine of the angle;

FIG. 8 shows a schematic diagram of the receiving section, in an alternative embodiment;

FIG. 9 shows the representation of the time/angle ambiguity function;

FIG. 10 shows the pattern of level lines for such a function;

FIG. 11 shows a representation of a plane array;

FIG. 12 shows a representation of a two-dimensional plane array; and

FIG. 13 shows a diagrammatic representation of a frequency-synthesiser which can be used within the scope of the invention.

DETAILED DESCRIPTION OF THE INVENTION

In accordance with the invention, the pulse-compression method employing space-coding involves the simultaneous transmission, from N sources, in the general case, which are arranged in the form of a regular linear array, of a plurality of N pulses, the frequencies of which are uniformly graded by an increment $\Delta f$. This results in received pulses which are compressed, the compression factor being equal to N, namely the number of pulses which were emitted.

These pulses are transmitted from a linear array containing N elementary sources, which are individually supplied by N transmitting devices, the duration of the emission being equal to $T = 1/\Delta f$.

FIG. 1 shows, diagrammatically, a linear array containing N sources, $S_O$ to $S_{N-1}$, and FIG. 2 represents the radiation pattern of this array as a function of frequency. Each source is connected to a transmitting device, $EM_O$ to $EM_{N-1}$.

The facts relating to the method according to the invention will be demonstrated in the following text.

The following parameters are defined in the linear array which is represented in FIG. 1;

- a: array spacing
- L: array length
- $\lambda$: wavelength
- f: frequency
- $\Delta f$: frequency increment, or spacing increment
- N: number of sources
- c: velocity of light in free space
- $\theta$: angle of the direction of a target with the normal to the array
- r: distance of the target from the reference source
- $F(\theta)$: diagram of an elementary source. This diagram is to be considered as common to all the sources, and the vectorial character defines the polarisation
- $A_n$: weighting coefficient of the source belonging to the row n
- $\tau_1$: duration of the primary, emitted pulse
- $\tau_2$: duration of the compressed pulse.

As has already been stated, the sources are simultaneously excited by a pulse of duration $\tau_1$, which is expressed in seconds, that is to say transmission is caused to take place between the instants $-\tau_{\frac{1}{2}}$ and $+\tau_{\frac{1}{2}}$, at frequencies which increase, in arithmetic progression, along the array. The source belonging to the row n is thus supplied at the frequency $$f_n = f_o = n\Delta f, \text{ where } \Delta f = 1/\tau_1 \quad (1)$$

Each source therefore emits a spectrum of width $\Delta f$, expressed generally, in Hertz, by the expression:

$$S_n(f) = \frac{\sin\pi \frac{f-f_o-n\Delta f}{f}}{\pi \frac{f-f_o-n\Delta f}{\Delta f}}$$

This spectrum is represented in FIG. 2.

If r and $\theta$ (FIG. 1) represent the polar coordinates of a distant point in space, M, which is located in the so-called Fraunhofer zone, the spherical wave emitted between the instants $-\tau_{\frac{1}{2}}$ and $+\tau_{\frac{1}{2}}$, by the source under consideration, belonging to the row n, is received at the point M with a delay which is a function of the distance $r_n$ between this source and the point M.

That is to say:

$$r_n = r - na \sin\theta \quad (3).$$

The field at the point M, due to the source belonging to the row n, has, therefore, the form $$\vec{E}_n(r,\theta,t) = A_n \vec{F}(\theta) \frac{1}{r_n} e^{i2\pi f_n(t-r_n/c)} \text{Rect}\left(\frac{t-\frac{r_n}{c}}{\tau_1/2}\right) \quad (4)$$

in which equation the function Rect is equal to unity over the interval $(-1,+1)$ and is equal to zero outside this interval.

The total field, $\vec{E}$, at the point M is the sum of the partial fields emitted by the various sources. It can be admitted, if the orders of magnitude of the numerical values corresponding to potential applications are considered, that a negligible error is made by simplifying the spherical attenuation coefficient from $1/r_n$ to $1/r$, and that the partial spherical waves are all received at the point M at the same time.

The total field received at M can be expressed as:

$$\vec{E}(r,\theta,t) = \frac{1}{r} e^{i2\pi f_o(t-r/c)} \vec{F}(\theta) IR(r,\theta,t) \quad (5)$$

in which formula the scalar function IR is a spatial and temporal array-factor.

This array-factor can be expressed as:

$$IR(r,\theta,t) = \quad (6)$$

$$\text{Rect}\left(\frac{t-r/c}{\frac{\tau_1}{2}}\right) \sum_{n=0}^{N-1} A_n e^{i2\pi n\left[\frac{a}{\lambda_o} \sin\theta(1+n\Delta f/f_o) + \Delta f(t-r/c)\right]}$$

In this expression, in the factor between brackets, the term $n\Delta f/f_o$ is, in general, completely negligible in comparison with 1.

By way of non-restrictive example, the following numerical values are considered:

$$n \leq 100, f_o - 3000 \text{ MHz}, f = 0.1 \text{ MHz}.$$

Under these conditions, $n\Delta f/f_o$ is less than 3/1000, and can be considered to be negligible. With this approximation, the array-factor R takes the form:

$$R(r,\theta,t) = \text{Rect}\left(\frac{t-\frac{r}{c}}{\frac{\tau_1}{2}}\right) \sum_{0}^{N-1} A_n x^n \quad (7)$$

in which $$x = e^{i2\pi[\Delta f(t-r/c) + a/\lambda \sin\theta]} \quad (8)$$

The expression (7) provides an idea of the zones in which the energy is concentrated. Its modulus, in fact, reaches a maximum when all the terms of the sum are in phase:

$$\Delta f(t-r/c) + a/\lambda \sin\theta = 0 \quad (9).$$

This expression defines a spiral zone, in space, which is receding at the velocity c. In the representation shown in FIG. 3, which gives the distance r as a function of sine $\theta$, for a spacing value, a, equal to $\lambda/2$, this zone is represented by a segment of a straight line.

The primary pulse, that is to say the emitted pulse, is represented between the ordinates A and B, and the duration of the pulse, $\tau_1$, is between the values $ct-\tau_{\frac{1}{2}}$ and $ct+\tau_{\frac{1}{2}}$. The compressed pulse is represented by the band which is included between the segments of the straight lines BC and DE. The width of this band is equal to $c\tau_2$, $\tau_2$ being the duration of the compressed pulse, which propagates in space at the speed of light, c.

If the duration of transmission had been $D\tau_1$, D being a positive integer, a burst of pulses would have been produced, defined by $$r - ct = a/\lambda c\tau_1 \sin\theta + kc\tau_1$$

where k is an integer such that $$0 \leq k < D \quad (10)$$

In FIG. 3, a compressed pulse deriving from the burst is represented by the band AG.

If the expression describing the array-factor is written for the particular, classical case, in which all the weighting coeffecients are equal, equation (7) leads to:

$$R(r,\theta,t) = \text{Rect}\left(\frac{t-c/r}{\tau_1/2}\right) x^{\frac{N-1}{2}} \frac{x^{N/2} - r^{-N/2}}{x^{1/2} - x^{-1/2}} \quad (11)$$

in which $$x^{\frac{N-1}{2}}$$

is the phase factor.

Taking into account relationship (8), within the limits of the phase factor $x^{\frac{N-1}{2}}$, the following applies:

$$R(r,\theta,t) = \tag{12}$$

$$A_0 N \,\text{Rect}\left(\frac{t - r/c}{\tau_1/2}\right) \frac{\sin N\pi[\Delta f(t - r/c) = a/\lambda \sin\theta]}{N\sin \pi[\Delta f(t - r/c) + a/\lambda \sin\theta]}$$

If a point P is considered, defined, in FIG. 3, by the abscissa sine $\theta_o$ and the ordinate $r_o$, the pulse which is observed at that point is represented in the graph of $R(r_o, \theta, t)$ as a function of time, shown in FIG. 4. The long emitted pulse is represented by the rectangle LSNQ, which extends (duration $\tau_1$) between the times $r_o/c - \tau_1/2$ and $r_o/c + \tau_1/2$, and the compressed pulse, I, exhibits an amplitude which is very much larger than that of the long pulse which was emitted, and has a duration, $\tau_2$, which is $$\tau_2 = \frac{1}{N\Delta f} = \tau_1/N$$

The compression factor applied to the pulse is equal to N, the number of sources contained in the linear array used for the emission.

The spectrum of this pulse is the convolution of the Fourier transforms of the two functions $$\text{Rect}\left(\frac{t - r/c}{\tau_1/2}\right) \text{and} \frac{\sin \pi NU}{N\sin\pi U}$$

where U reproduces the term $\Delta f(t-r/c)+a/\lambda \sin \theta$. This is therefore the convolution of the spectrum, given by relationship (2) and FIG. 2, of a pulse of duration $\tau_1$, by the comb function representing the base frequencies, that is to say the various frequencies which were emitted. It is easy to determine the sum of the spectra of the emitted pulses, that is to say $$S(f) = \sum_{0}^{N-1} (A_n)s_n(f)$$

this sum being represented in FIG. 5. The width of the spectrum is equal to $N\Delta f$.

If, as in FIG. 6, a representation of the array-function, R, is considered as a function of the sine of the angle in which the observation is made, that is to say sine $\theta$, it is seen that, for a given distance r, at a given instant t, an angular aperture-diagram is obtained, of the classical shape:

$$\theta_{3\,dB} = \lambda/Na = \lambda/L \tag{14}$$

with a principal lobe in the direction of the maximum, that is to say $$\theta_o = \frac{\lambda}{2a} \cdot \frac{t - \frac{r}{c}}{\frac{\tau_1}{2}} \tag{15}$$

If the weighting coefficients are not equal, but are chosen in an appropriate manner, according to the classical rules for arrays, the pulse obtained being the convolution of the pulse represented in FIG. 6 with the Fourier transform of the weighting function, the result is a reduction in the near lateral lobes, and the general shape of the emitted pulse is thus $$\psi\left(t - r/c + \frac{a}{\lambda}\tau_1 \sin\theta\right) \tag{16}$$

In the text which follows, it is possible to cite a numerical application, by way of example, considering the following values of certain parameters which have been defined in the introduction of the present description:

| | |
|---|---|
| number of sources | N = 100 |
| array spacing | $a = \lambda_o/2$ |
| carrier frequency | fo = 3000 MHz |
| frequency increment | $\Delta f$ = 100 kHz or 10 kHz |
| duration of the primary pulse | $\tau_1$ = 10 µs or 100 µs |
| total frequency band | $N\Delta f$ = 10 MHz or 1 MHz |
| duration of the compressed pulse | $\tau_2$ = 0.1 µs or 1 µs |

The repetition frequency depends only on the range which is envisaged.

If reception by a multi-beam antenna is considered, for example by means of a BFC antenna (for the formation of beams by calculation), a beam-aperture, $\theta_o$ of approximately 20 milliradians will be obtained, equivalent to 1.2 degrees, and if the surveillance coverage is to extend between $-45°$ and $+45°$, the number N' of beams used is of the order of 70.

Each receiver RE, see FIG. 1, is preceded by a band-rejection filter Fi, of width $N\Delta f$, and by a duplexer DU.

In a representation similar to that of FIG. 3, in which distance is plotted as a function of sin $\theta$, the duration $\tau_1$ of the emitted pulse, of the order of 100 µs, occupies a distance of the order of 30 km, while that of the compressed pulse, $\tau_2$, at 1 µs, occupies a distance of 300 meters.

It is possible to determine whether, in the method according to the invention, there is an angle/distance ambiguity. In multi-beam reception, this ambiguity is negligible, it being possible to eliminate its residual effect with the aid of monopulse diagrams which are easy to produce in accordance with the principles of the formation of beams by calculation. The residual distance-error, in fact, is the product of the aperture, at 3 dB, of the elementary beam, multiplied by the "slope" of the representation of the spiral pulse, that is to say $$\Delta r = \frac{a}{\lambda} \cdot c\,\tau_1 \cdot \theta 3dB = \frac{a}{\lambda} c\,\tau_1 \frac{\lambda}{Na} = c\,\tau_2 \tag{17}$$

This error corresponds to the length of the compressed pulse.

This ambiguity can be avoided, and simultaneous measurement of angle and distance is possible with a single receiver, having simple correlators, using the modified version of the method according to the invention.

As stated in the introductory portion of their document, a first plurality of pulses are transmitted, simultaneously, at frequencies which are graded along the transmitting array, in the sense that they increase by steps equal to $\Delta f$, from left to right. This is followed by the simultaneous transmission of a second plurality of pulses, at frequencies which are graded along the transmitting array, in the sense that they decrease in steps equal to Δf, from left to right. The two spirals which, according to the invention, are transmitted, and which are represented in FIG. 7, in which the time t is given as a function of sine θ, are inclined in opposite directions, the first spiral being defined by the line ab, and the second by the line cd. A target in the direction θ therefore returns two pulses, which are separated by an interval $$\Delta T(\theta) = T - \frac{2a}{\lambda} \tau_1 \sin \theta \qquad (18)$$

in which equation T is the repetition time.

If it is desired to detect targets situated in this direction, the first series of pulses received are delayed by the quantity ΔT(θ), and are multiplied by the second series, in order to identify only those echoes which are situated in the direction θ.

In this case, with regard to reception, a single receiver is adequate, associated with an antenna which is only slightly directional, or is even omnidirectional. However, the energy balance for a skin echo is N times less favourable than in the case where a multi-beam receiving antenna is used. It is possible, nevertheless, in order to exploit the advantages given by the first solution and by the alternative embodiment, to combine the two methods, which improves the overall directional characteristics of the system.

FIG. 8 is a schematic diagram of a receiving apparatus which can be used with the alternative embodiment of the invention.

Starting from a receiving antenna 1, which is only slightly directional, or is even omnidirectional, there follows a receiver 2 which processes the two compressed pulses which are received, I1. I2, and outputs them, for example at an intermediate frequency. The receiver supplies two sets of channels, a direct channel 3 and a number of delayed channels, $4_0$ to $4_{N-1}$. Each of these delayed channels includes a delay element $5_0$ to $5_{N-1}$, the delay applied to each pulse being $$\Delta Tn = T - \frac{2a}{\lambda} \tau_1 \sin \theta n.$$

Each delayed channel is connected to a coherent demodulator, $6_0$ to $6_{N-1}$, which is likewise connected to direct channel 3. Each demodulator outputs a pulse which is known to have arrived from a particular direction, and which is sent to a processing unit. Thus, demodulator $6_n$ outputs a pulse 7 which arrives from the direction $\theta_n$.

It is possible to study the ambiguity function relating to time or to distance/angle. This function is obtained by considering the return from a target possessing the co-ordinates (r, θ), to a correlator which has been set up for the direction $\theta_o$.

According to the expression (16), the first pulse returned by the target has the form:

$$S1(t) = \psi \left( t - \frac{2r}{c} + \frac{a}{\lambda} \tau_1 \sin \theta \right).$$

while the second pulse has the form:

$$S2(t) = \psi \left( t + T - \frac{2r}{c} - \frac{a}{\lambda} \tau_1 \sin \theta \right).$$

The first pulse is delayed by the quantity corresponding to the direction $\theta_o$ $$\Delta T(\theta o) = T - \frac{2a}{\lambda} \tau_1 \sin \theta o$$

It assumes the form:

$$S'1(t) = \psi \left[ t + T - \frac{2r}{c} + \frac{a}{\lambda} \tau_1 \sin \theta - 2 \sin \theta o \right)\right]$$

The product reaches a maximum when sin θ=sin θ$_o$, and at the instant t$_o$, such that $$t_o + T - \frac{2r}{c} = \frac{a}{\lambda} \tau_1 \sin \theta o$$

If sin θ is taken as equal to (sin θ$_o$=Δθ), and t is taken to equal (t$_o$+Δt), the resulting product can be written as:

$$P(\Delta\theta, \Delta t) = \psi \left( \Delta t - \frac{a}{\lambda} \tau_1 \Delta\theta \right) \psi \left( \Delta t + \frac{a}{\lambda} \tau_1 \Delta\theta \right)$$

If a quasi-Gaussian pulse, of width $\tau_2$, is assumed:

$$P(\Delta\theta, \Delta t) = \psi^2_o \; e^{-1/\tau 2^2 \left[ \left( \Delta t - \frac{a}{\lambda} \tau_1 \Delta\theta \right)^2 + \left( \Delta t + \frac{a}{\lambda} \tau_1 \Delta\theta \right)^2 \right]}$$

that is to say:

$$P(\Delta\theta, \Delta t) = \tau_0^2 \; e^{-\left(\frac{\Delta t}{\tau 2}\right)^2} \cdot e^{-\left(\frac{\Delta\theta}{\lambda/L}\right)^2}$$

An ambiguity function is thus found, which contains the duration $\tau_2$, of the compressed pulse, and the angular aperture τ/L (width at 3 dB).

FIG. 9 provides a representation of this ambiguity function, in space, and FIG. 10 shows the pattern of level lines, with the pulses expressed as function of sin x/x.

In the principal planes, the value (sin x/x)$^2$ applies.

With multi-beam reception, the angular resolution is enhanced, since it is necessary to multiply the previous diagram, FIG. 9, by the reception diagram involving $$\frac{\sin \frac{\pi \Delta\theta}{\lambda/L}}{\frac{\pi \Delta\theta}{\lambda/L}}$$

In the preceding text, a pulse-compression method employing space-coding has been described, in which signals are simultaneously transmitted at several points in space, these signals are characterised by frequencies which vary uniformly, and in a stepwise manner, from one point to the next. The sources thus constituted a linear array.

In order to form a plane array, it is possible to group, by superposition, a plurality of linear arrays. FIG. 11 represents, in a schematic manner, an array of this type, containing, for example, N horizontal linear arrays of the type represented in FIG. 1, which have been placed one above another. These superposed linear arrays, 0, 1, 2 ... (N−1), are supplied in parallel, from emitting devices, $EM_o$ ... $EM_{(N-1)}$, in accordance with the principle which has been described by reference to FIG. 1, in a manner such that sources which are located on the same vertical line, $S_{00}$, $S_{00}$, $S_{01}$ ..., are all operating at the same frequency, and that, from one vertical line to the next, the frequencies differ by an increment $\Delta f$, the sources on the last vertical line on the extreme right of FIG. 11, $S_{0(N-1)}$ to $S_{M(N-1)}$, operating at the frequency $f_o+(N-1)\Delta f$.

If phase shifters are associated with the various sources, vertical electronic scanning, that is to say elevation-scanning, is combined with the pulse-compression.

It is equally possible, by means of another grouping of the arrays and of their power-supply arrangements, to produce what is termed a two-dimensional array incorporating N columns and M lines, such as is represented in FIG. 12. In geometric terms, this array does not differ from the representation in FIG. 11, but its power-supply arrangements are different. As a matter of fact, the sources are supplied at frequencies which increase uniformly, line by line, by an increment $\Delta f$, in a manner such that the source Smn, located at the intersection of the line m and the column n, is supplied at the frequency:

$$fmn = fo + (n-1)N\Delta f + m\Delta f.$$

The pulse transmitted by an array of this type is thus compressed, in the form of a nappe, with a compression factor $\tau_2/\tau_1 = N.M$.

In the preceding description, it has been indicated that the pulsed signals under consideration were at frequencies which were coherent, pure and stable, and that they fall back into phase at instants which are separated by time intervals which are both constant and equal. Signals of this nature are produced in a frequency-synthesiser, of which a relatively simple design is given in the text which follows, by way of an example, and by reference to the schematic diagram represented in FIG. 13.

This synthesiser incorporates a reference generator 130, which outputs reference signals at a stable frequency.

It is quartz-crystal-controlled and outputs reference signals to all the sub-assemblies which make up the synthesiser represented in FIG. 13. This generator thus controls the synthesiser 133 generating the local waves, on which frequency-agility is imposed, which a distributor 134 transmits to the receiver of a radar installation and to single-sideband mixers, 135, 136, 137, which are respectively inserted into the channels I to N supplying the elementary antennae which make up the linear array under consideration in the radar to which the invention relates. Starting from the mixer 135, the first channel, I, supplies, for example, the central antenna AC, while the other channels supply the two antennae which are arranged symmetrically with respect to the central antenna. The other mixers, 136, 137, are thus respectively connected, via their two output connections, to antennae which are positioned symmetrically with respect to the central antenna, the mixer 136 supplying the antennae $A_{c-1}$ and $A_{c+1}$, and the mixer 137, in the channel N, supplying the antennae $A_{c-N}$ and $A_{c+N}$. The pulse-generator BF 132, which outputs the frequency-increments, $\Delta f$ to $N.\Delta f$ to the various channels, is likewise controlled by the reference generator 130, in the same way as the synthronisation-pulse generator 131 controls the generator 132.

A pulse-compression method employing space-coding has thus been described.

I claim:

1. A pulse compression radar method, comprising the steps of:

simultaneously transmitting, from N antenna elements of an antenna array, N coded pulse signals, one pulse signal being transmitted from each antenna element, each pulse signal having a duration $\tau_1$, the frequencies of the N signals each being different from one another and uniformly graded in frequency from one antenna element to the next element of the array by an increment of $\Delta f$, equal to $1/\tau_1$, the transmitted pulse signals being in phase with one another at times separated by time intervals of $\tau_1$;

reflecting from a target the transmitted pulsed signals;

receiving, at the N antenna elements, the target reflected signals, the received signals being spatially compressed by a factor of N, each of the received signals having a duration $\tau_2 = \tau_1/N$; and processing the signals received at each antenna element through N separate band-pass filters, each band-pass filter filtering the signal from a single one of said N antenna elements, each filter having a frequency width of $N \times \Delta f$, to produce target range and angle information.

2. A pulse compression radar method, comprising the steps of:

first simultaneously transmitting, from N antenna elements of an antenna array, N coded pulse signals, one pulse signal being transmitted from each antenna element, each pulse signal having a duration $\tau_1$, the frequencies of the N signals each being different from one another and uniformly increasing in frequency from a first antenna element to a last antenna element of the array by an increment of $\Delta f$, equal to $1/\tau$, the transmitted pulse signals being in phase with one another at times separated by time intervals of $\tau_1$;

after said first simultaneously transmitting step, second simultaneously transmitting, from N antenna elements of an antenna array, N coded pulse signals, one pulse signal being transmitted from each antenna element, each pulse signal having a duration $\tau_1$, the frequencies of the N signals each being different from one another and uniformly decreasing in frequency from said first antenna element to said last antenna element of the array by an increment of $\Delta f$, equal to $1/\tau$, the transmitted pulse signals being in phase with one another at times separated by time intervals of $\tau_1$;

reflecting, from a target, the first and second transmitted signals;

receiving the reflected signals, the received signals being spatially compressed, the compression factor being equal to N, each of the received signals having a duration $\tau_2 = \tau_1/N$; and delaying the received signals by a plurality of different amounts in a plurality of delayed channels, respectively, each delay amount being a function of N and Δf;

coherently demodulating signals from each of the delayed channels with reference to an undelayed received signal; and processing the demodulated signals to provide angle and distance information about said target.

3. A pulse compression radar comprising:

an N antenna element array;

means for simultaneously transmitting, from N antenna elements of said antenna array, N coded pulse signals, one pulse signal being transmitted from each antenna element, each pulse signal having a duration $\tau_1$, the frequencies of the N signals each being different from one another and uniformly graded in frequency from one antenna element to the next element of the array by an increment of Δf, equal to $1/\tau$, the transmitted pulse signals being in phase with one another at times separated by time intervals of $\tau_1$;

means for receiving N signals, one from each antenna element, reflected from a target, the received signals being spatially compressed by a factor of N, each of the received signals having a duration $\tau_2 = \tau_1/N$;

N band pass filters, one for filtering the signal received from each of the antenna elements, each filter having a frequency width of $N \times \Delta f$; and means for processing the signals filtered by each of said filters to provide target angle and range information.

4. A radar according to claim 3 wherein said antenna array comprises a linear array of elements.

5. A radar according to claim 3 wherein said antenna array comprises a plurality of linear arrays of antenna elements, the linear arrays being parallel to one another.

6. A radar according to claim 5 wherein said plurality of linear arrays comprises a plurality of linear arrays arranged so as to form an $N \times M$ array of antenna elements containing NM elements and wherein the frequency radiated by an element at the Mth line and the Nth column is given by the following equation:

$$fmn = fo + (n-1)N\Delta f + n\Delta f$$

the compressed pulses received having a compression factor $\tau_2/\tau_1 = N \times M$.

7. A pulse compression radar comprising:

an N antenna element array;

means for simultaneously transmitting, from N antenna elements of said antenna array, N coded pulse signals, one pulse signal being transmitted from each antenna element, each pulse signal having a duration $\tau_1$, the frequencies of the N signals each being different from one another and uniformly graded in frequency from one antenna element to the next element of the array by an increment of Δf, equal to $1/\tau$, the transmitted pulse signals being in phase with one another at times separated by time intervals of $\tau_1$;

means for receiving signals reflected from a target, a direct channel for processing, substantially undelayed, signals from said receiving means;

a plurality of delay channels, each delay channel having a delay element for delaying a signal received from said receiving means to form a plurality of received signals, each being delayed by a different amount with respect to the signal of said direct channel;

a plurality of coherent demodulators, one being coupled to each of said delay elements and to said direct channel for demodulating a signal from its associated delay element; and means for processing signals demodulated by said coherent demodulators to provide target angle and range information.

8. A radar according to claim 7 wherein said antenna array comprises a linear array of elements.

9. A radar according to claim 7 wherein said antenna array comprises a plurality of linear arrays of antenna elements, the linear arrays being parallel to one another.

10. A radar according to claim 9 wherein said plurality of linear arrays comprises a plurality of linear arrays arranged so as to form an $N \times M$ array of antenna elements containing NM elements and wherein the frequency fmn radiated by an element at the Mth line and the Nth column is given by the following equation:

$$fmn = fo + (n-1)N\Delta f + m\Delta f$$

pulses reflected from the target having a compression factor $\tau_2/\tau_1 = N \times M$.

* * * * *